J. L. BUTLER.
TOOL MOUNTING FOR TIRE MACHINES.
APPLICATION FILED NOV. 2, 1918.

1,300,341.

Patented Apr. 15, 1919.
3 SHEETS—SHEET 1.

Inventor
James L. Butler
By Robert M Pierson
Atty.

J. L. BUTLER.
TOOL MOUNTING FOR TIRE MACHINES.
APPLICATION FILED NOV. 2, 1918.

1,300,341.

Patented Apr. 15, 1919.
3 SHEETS—SHEET 3.

Inventor
James L. Butler
By Robert M. Pierson
Atty.

UNITED STATES PATENT OFFICE.

JAMES L. BUTLER, OF AKRON, OHIO, ASSIGNOR TO THE B. F. GOODRICH COMPANY, OF NEW YORK, N. Y., A CORPORATION OF NEW YORK.

TOOL-MOUNTING FOR TIRE-MACHINES.

1,300,341.          Specification of Letters Patent.      Patented Apr. 15, 1919.

Application filed November 2, 1918. Serial No. 260,895.

*To all whom it may concern:*

Be it known that I, JAMES L. BUTLER, a citizen of the United States, residing at Akron, in the county of Summit and State of Ohio, have invented a certain new and useful Tool-Mounting for Tire-Machines, of which the following is a specification.

This invention relates to the mounting of tools which are yieldingly pressed against their work, and particularly the side tools used in machines for building pneumatic-tire casings. My object is to provide an improved means for holding the tool in an operative or an inoperative position.

Of the accompanying drawings.

Figure 1:
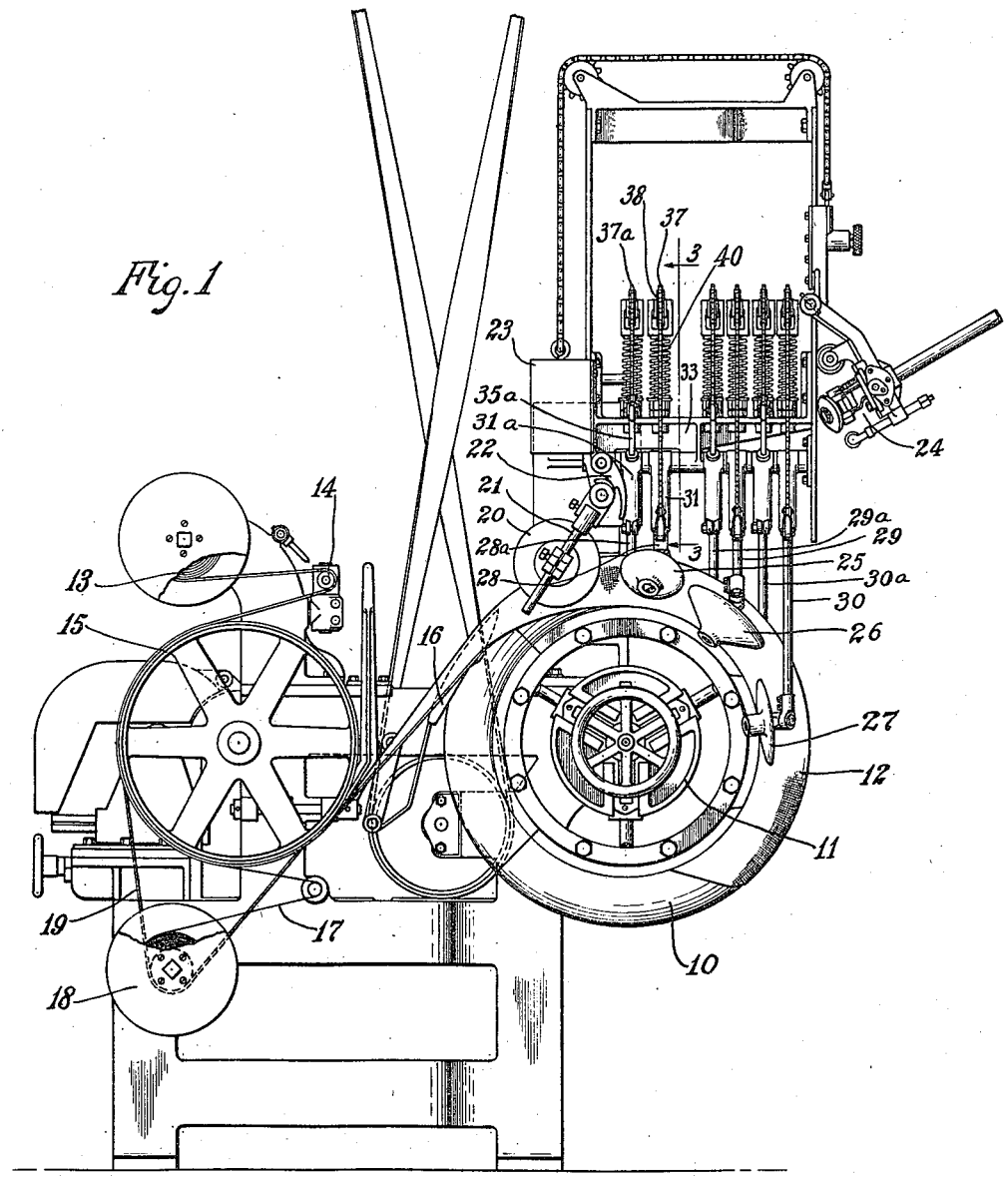
Figure 1 is a side elevation of a tire machine provided with a series of tool mountings embodying my invention.

In the drawings, I have shown the invention applied to a tire-building machine having means for winding a strip of tire material such as bias-cut, woven, rubber-frictioned fabric, circumferentially upon a tire-making core, and stretching and forming the fabric substantially into tire shape during the winding; together with side tools acting upon the stretched fabric during and after the winding operation to shape the same against the undercut sides of the core, and a tread-rolling device for conforming the rubber tread to the carcass; but the invention is equally applicable to machines in which the plies of tire-forming material are shaped in other ways than by wrapping a strip of the material upon the core, or a machine without the tread-rolling device, and may in fact be employed in any appropriate connection.

10 is the tire-forming core mounted upon a power-driven chuck 11, and 12 is the strip of rubberized fabric which is unwound from a roll 13, is passed around a small fabric-guiding roller 14, and is led onto the core after passing around a geared feed-drum 15 whose peripheral speed is somewhat less than that of the core, and over a transversely and longitudinally-curved fabric-shaping guide-shoe 16 interposed between said drum and the core. 17 is the liner strip which unwinds with the tire-forming strip 12 and is rewound on a roll 18 whose shaft is rotated by a belt 19 and suitable pulleys from the shaft of the feed drum 15. 20 is a deeply-grooved, weighted tread roller resting against the formed strip 12 just after it leaves the fabric-forming guide 16, and mounted on a pivoted holder 21 adapted at times to be held out of operative position by a dog or pawl 22. The drawing also shows, in an elevated inoperative position in which it is sustained by a counter-weight 23, a tool structure 24 for rolling down the rubber tread strip which is applied to the tire carcass on the core before removing the latter from the machine.

Figure 2:
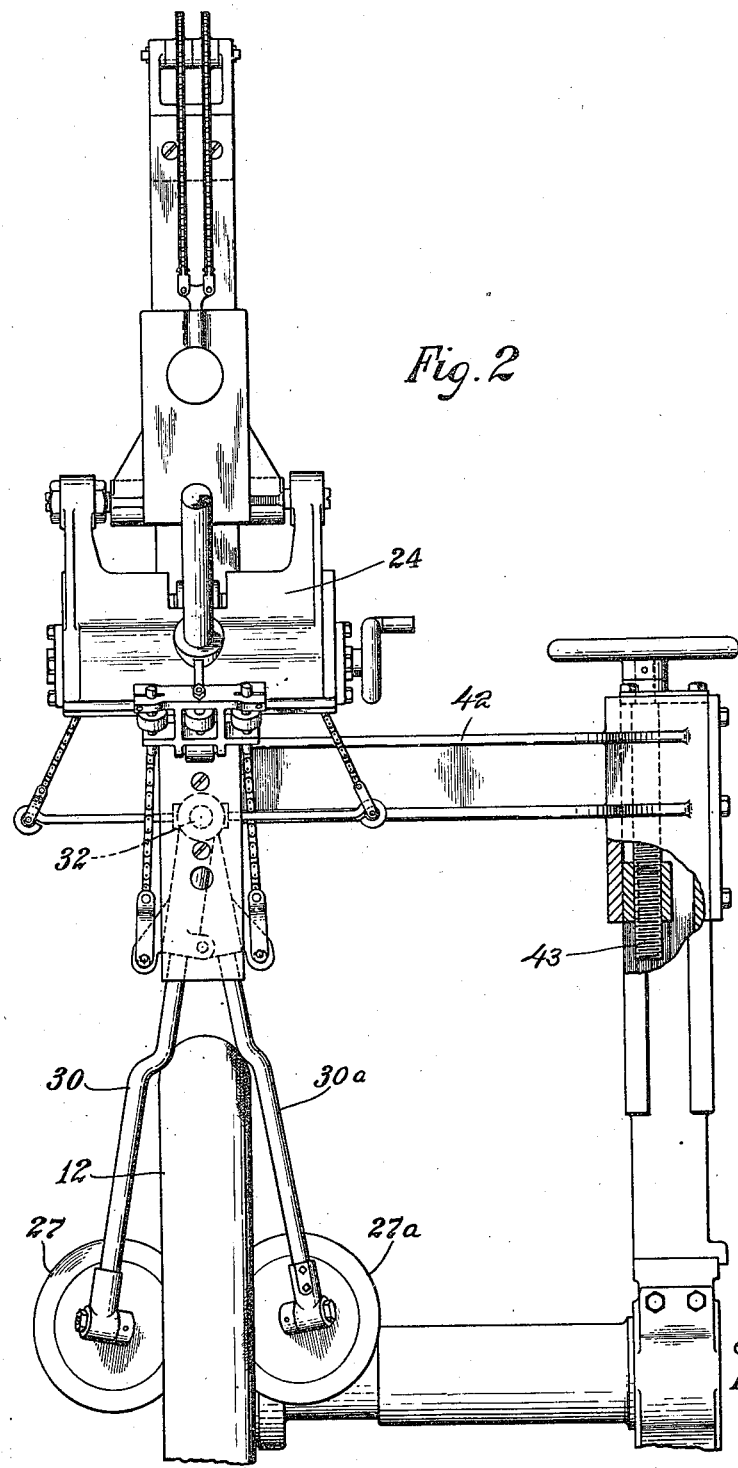
Fig. 2 is a front elevation of the upper part of the machine on a larger scale.

The side tools are of any suitable type, but here shown as comprising three pairs of disk-shaped rollers 25, $25^a$, 26, $26^a$, 27, $27^a$ operating against the sides of the formed strip 12 at successive points along the circumference and in different radial positions, for smoothing the marginal portions of said strip against the sides of the core. The exponent $a$ is applied to the tools and certain of their connections operating against the right-hand side of the tire, to distinguish from the like parts operating against the left-hand side. The pairs of holder arms 28, $28^a$, 29, $29^a$ and 30, $30^a$, supporting the respective pairs of disks, are of different lengths corresponding to the positions of the latter, but otherwise the form of mounting for all of the disks is the same. Each holder arm consists of telescoped sections relatively adjustable for total length, the inner section 31 or $31^a$ being mounted to rock loosely upon a shaft 32 common to all of the tool holders. The sections $31^a$ for the tools on the right-hand side of the machine are arrested in their inoperative positions by abutting directly against the lower edge of a longitudinal frame member 33, and the sections 31 on the left are provided with set-screws 34 for abutting against another part of this frame member to arrest them in their inoperative positions. When the tools are in these inoperative positions, an indicated in Fig. 4, their holder sections 31, $31^a$ are approximately horizontal. Each of the tool-holders further includes an arm 35 or $35^a$ projecting from the section 31 or $31^a$ at an angle slightly greater than a right-angle and standing in an approximately vertical position when the tools are inoperative. The tools are mounted upon a frame 42 which is vertically adjustable by means of the screw 43 shown in Fig. 2 to accommodate tires of different diameters.

On each arm section or radius 31 or 31ª, at a distance from the shaft 32 substantially equal to the arm or radius 35 or 35ª, is an ear 36 or 36ª connected with the arm 35 or 35ª by a flexible tractive element in the form of a chain 37 or 37ª. The several chains form substantially V-shaped loops in the bights of which are located sprocket wheels 38 carried on bearings at the upper ends of plungers 39 which are pressed upwardly by springs 40 surrounding said plungers and the sockets 41 in which the plungers slide. The sockets have their lower ends fixed in the frame member 33 and the tension of any spring is adjustable by means of a nut 44 which is locked by another nut 45.

Figure 3:
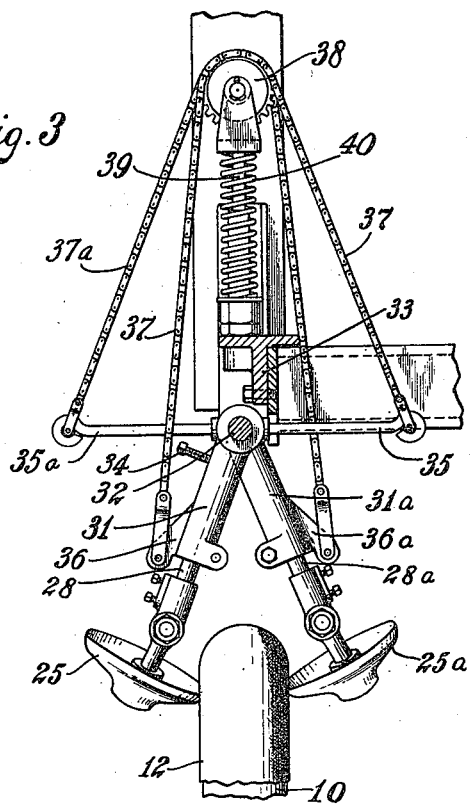
Figs. 3 and 4 are front elevations partly in section showing a pair of the tools in their operative and inoperative positions respectively.
Figure 4:
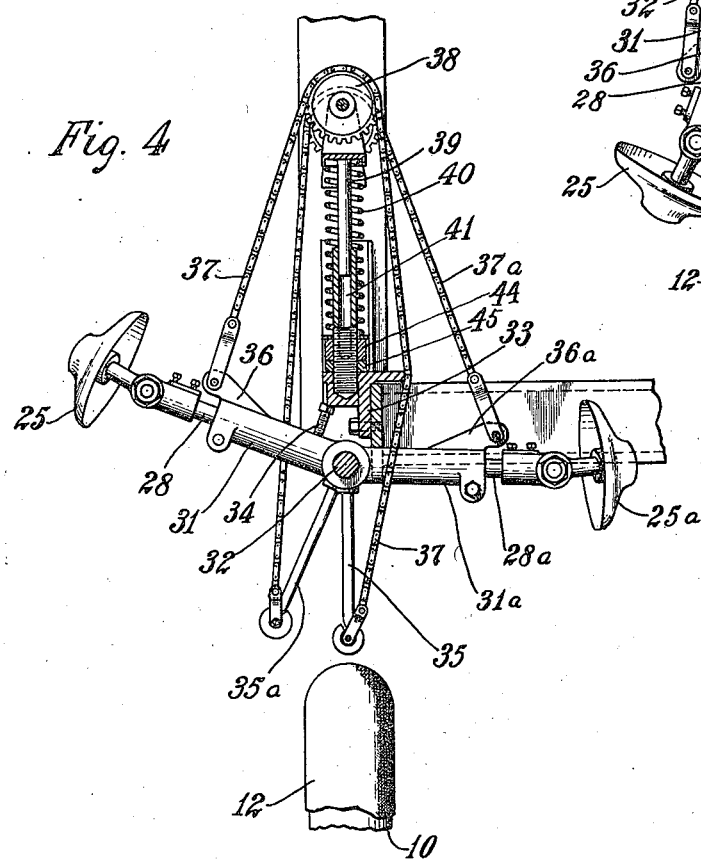

In the operation of my invention, each tool holder is separately operated by manually throwing it up into the inoperative position which both disks of the pair 25, 25ª are shown as occupying in Fig. 4, or downwardly into a tire-engaging position as represented in Fig. 3. Referring, for example, to the left-hand disk 25, it will be noted that in going from one position to the other, each of the arms 28, 35 of the tool holder passes through an angle of 90°, more or less, depending upon the size of the tire, and the points of attachment of the chain 37 to the two arms describe equal arcs of a circle, corresponding roughly to the "southwest" and "southeast" quadrants. When the two ends of the chain 37 are in the middle parts of these arcs, the angle formed between the two portions of the chain on either side of the sprocket wheel 38 is greater than the angle formed between said portions when the tool-holder is in either of its extreme positions,—consequently the bight of the chain loop is depressed and the plunger 39 is lowered against the pressure of the spring 40 as the tool-holder passes through its middle position. The spring therefore exerts a turning pressure upon the tool-holder in both the operative and inoperative positions of the latter, tending to hold the disk 25 in that position. In the operative position, the disk 25 is yieldingly pressed against the side of the core or the tire thereon. This mechanism is simpler and more satisfactory in operation than the system of weights, cords and pulleys heretofore employed for controlling the tool-holder.

It will be understood that various changes in detail may be made without departing from the scope of my invention.

I claim:

1. A tool-mounting comprising a rocking tool-holder carrying a tool mounted to swing therewith toward and from its working position, a flexible tractive element attached at two radii on said tool-holder, a guide for said flexible element dividing the latter into portions which make a greater angle with each other in an intermediate position than in the two extreme positions of the tool holder, and means yieldingly pressing said guide against said flexible element.

2. In a tire-building machine, the combination of a tire-forming core, a tool for operating against the side of said core, a rocking holder for said tool having two arms at an obtuse angle to each other, a flexible tractive element having its ends connected to the respective arms, and a wheel yieldingly pressed against said flexible element and dividing the same into two angularly-related parts which make a greater angle with each other in the middle position than in the two extreme positions of the holder, whereby the latter is yieldingly retained in its operative and inoperative positions.

3. In a tire-building machine, the combination of a tire-forming core, a roller adapted to smooth the tire material on the side of said core, a rocking holder for said roller having a pair of arms at an angle, a flexible tractive element forming a substantially V-shaped loop connecting said arms, the depth whereof is greater in the two extreme positions than in the middle position of said holder, a wheel in the bight of said loop, a plunger on which said wheel is journaled, and a spring under said plunger for pressing said wheel against the loop.

4. In a tire-building machine, the combination of a tire-forming core, a tool-holder pivoted to rock on an axis located above said core and having a pair of arms at an obtuse angle to each other, a vertically-movable plunger mounted above the axis of said tool-holder, a spring urging said plunger in an upward direction, a wheel carried by the plunger, and a flexible tractive element connecting said holder arms and forming a loop over said wheel, the bight of which is lowered against the pressure of said spring as the tool-holder passes through an intermediate position from its operative to its inoperative position or vice versa.

5. In a tire-building machine, the combination of a tire-forming core, a side-tool holder pivoted to rock on a horizontal axis located above said core, a vertically-movable plunger mounted above said axis and carrying a sprocket-wheel, a spring urging said plunger and wheel upwardly, and a chain connecting angularly-related radii of said holder and forming a loop over said sprocket wheel, the bight of which descends and depresses the wheel and plunger as the tool-holder passes through a position intermediate of its two extreme positions.

In testimony whereof I have hereunto set my hand this 31 day of October 1918.

JAMES L. BUTLER.